United States Patent
Koutsimanis et al.

(10) Patent No.: US 10,178,680 B2
(45) Date of Patent: Jan. 8, 2019

(54) METHOD, NETWORK NODE, COMPUTER PROGRAM AND COMPUTER PROGRAM PRODUCT FOR ASSISTING DOWNLINK INTERFERENCE ESTIMATION

(71) Applicant: Telefonaktiebolaget L M Ericsson (publ), Stockholm (SE)

(72) Inventors: Chrysostomos Koutsimanis, Stockholm (SE); Erik Dahlman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 352 days.

(21) Appl. No.: 14/904,119

(22) PCT Filed: Jul. 12, 2013

(86) PCT No.: PCT/SE2013/050899
§ 371 (c)(1),
(2) Date: Jan. 11, 2016

(87) PCT Pub. No.: WO2015/005838
PCT Pub. Date: Jan. 15, 2015

(65) Prior Publication Data
US 2016/0157247 A1    Jun. 2, 2016

(51) Int. Cl.
*H04W 72/08* (2009.01)
*H04W 52/22* (2009.01)
(Continued)

(52) U.S. Cl.
CPC ........ *H04W 72/085* (2013.01); *H04B 17/345* (2015.01); *H04L 5/005* (2013.01);
(Continued)

(58) Field of Classification Search
CPC ............ H04W 72/085; H04W 52/243; H04W 72/082; H04W 52/223; H04W 52/225;
(Continued)

(56) References Cited

U.S. PATENT DOCUMENTS

2006/0234704 A1   10/2006   Lee et al.
2011/0312358 A1   12/2011   Barbieri et al.
(Continued)

FOREIGN PATENT DOCUMENTS

EP    2663002 A1    11/2013
WO    2013069345 A1    5/2013

OTHER PUBLICATIONS

Unknown, Author, "CQI definition for DL CoMP", 3GPP TSG RAN WG1 Meeting #69 R1-122292, Prague, Czech Republic, May 21-25, 2012, 1-4.
(Continued)

*Primary Examiner* — Melvin C Marcelo
(74) *Attorney, Agent, or Firm* — Sage Patent Group (57) ABSTRACT

It is provided a method for assisting downlink interference estimation in a cellular network. The method is performed in a network node of the cellular network and comprises the steps of: estimating an average transmit power of the network node in a future time period, resulting in a scaling factor indicating the average transmit power of the network node in relation to a reference transmit power of the network node; transmitting, in a resource element allocated to interference estimation, a reference signal for downlink interference estimation with a transmission power which is based on the scaling factor; and refraining from transmitting in a resource element in at least one instance where another network node transmits a reference signal for downlink interference estimation. A corresponding network node,
(Continued)

computer program and computer program product for assisting downlink interference estimation are also presented.

12 Claims, 3 Drawing Sheets

(51) Int. Cl.
| | | |
|---|---|---|
| *H04B 17/345* | (2015.01) | |
| *H04L 5/00* | (2006.01) | |
| *H04W 52/24* | (2009.01) | |
| *H04W 72/04* | (2009.01) | |
| *H04W 52/34* | (2009.01) | |
| *H04W 52/32* | (2009.01) | |
| *H04W 52/36* | (2009.01) | |

(52) U.S. Cl.
CPC ........... *H04L 5/0073* (2013.01); *H04W 52/22* (2013.01); *H04W 52/243* (2013.01); *H04W 72/0473* (2013.01); *H04W 52/223* (2013.01); *H04W 52/225* (2013.01); *H04W 52/325* (2013.01); *H04W 52/343* (2013.01); *H04W 52/367* (2013.01); *H04W 72/082* (2013.01)

(58) Field of Classification Search
CPC ............. H04W 52/343; H04W 52/325; H04W 72/0473; H04W 52/22; H04L 5/0073; H04L 5/005; H04B 17/345
See application file for complete search history.

(56) References Cited

U.S. PATENT DOCUMENTS

| | | | | |
|---|---|---|---|---|
| 2012/0315859 | A1* | 12/2012 | Lee, II | .................... H04J 11/005 455/67.13 |
| 2013/0194940 | A1 | 8/2013 | Li et al. | |
| 2013/0301432 | A1 | 11/2013 | Hammarwall et al. | |
| 2013/0303090 | A1 | 11/2013 | Hammarwall et al. | |
| 2014/0187282 | A1* | 7/2014 | Sankaran | ............ H04W 52/343 455/522 |

OTHER PUBLICATIONS

Unknown, Author, "Interference Measurement Offset", 3GPP TSG-RAN WG1 #70 R1•123829, Qingdao, China, Aug. 13-17, 2012, 1-3.
Unknown Author, "Downlink Power Allocation for CSI-RS", 3GPP TSG RAN WG1 #62 R1-104598 Madrid, Spain Source: Samsung, Aug. 23-Aug. 27, 2010, 1-2.

* cited by examiner

METHOD, NETWORK NODE, COMPUTER PROGRAM AND COMPUTER PROGRAM PRODUCT FOR ASSISTING DOWNLINK INTERFERENCE ESTIMATION

TECHNICAL FIELD

The technology relates to a method, network node, computer program and computer program product for assisting downlink interference estimation.

BACKGROUND

Interference or noise estimation plays a key role in the performance of a cellular network. In the case of an LTE (Long Term Evolution) network comprising a number of network nodes (such as radio base stations) and wireless devices (such as instances of user equipment, UE), downlink interference estimation is typically involved in two different processes. The first one is the demodulation of the useful downlink signal from a serving network node. The received signal is usually a mix of the useful signal which carries the information from the serving network node, and interfering signals originating from other network nodes. The receiver attempts to obtain an estimation of the interfering network nodes in order to estimate the useful signal. The more accurate the interference estimation is, the better the reception of useful signal is. The second process is channel quality estimation (CQI). Here, each wireless device should estimate and report to the transmitter the experienced interference. The last one is used in link adaptation (LA) for selecting appropriate modulation and coding rate as well as precoder and rank for the oncoming transmissions. The more accurate the interference estimation is, the better the LA works leading to successful reception. From the above it is obvious that accurate interference estimation can improve data reception at the UE side as well as the overall network performance.

In LTE Release 8, downlink interference estimation for both demodulation and CQI estimation is based on a set of resource elements which are called CRSs (Cell specific Reference Signals). The CRSs are regularly transmitted on every subframe by each network node. They have a predefined density on the frequency domain and thus occupy specific places within a resource block. CRSs are always transmitted from each cell independent of whether the cell is transmitting data or not. This mismatch between data and CRS transmissions leads to a big mismatch between the estimated and the actual data interference.

In LTE Release 11, interference estimation for CQI estimation is also possible based on a set of resource elements which are called IMRs (Interference Measurement Resources). The IMRs are muted resource elements, in which no data or signaling is scheduled, which are used for interference estimation of surrounding cells. They occur in predefined time cycles with a fixed frequency density according to an IMR configuration. The IMRs of a specific cell are thus able to collide with normal data transmissions of other cells with different IMR configurations. Compared to CRS, the mismatch between estimated and actual interference is reduced when the IMRs of a network node collide with actual data transmissions of other cells. In addition, IMRs are muted resource elements thus avoiding the impact of own useful signal on interference estimation. Nevertheless, there can still be a bias in the estimation introduced by cells that reuse the same IMR configuration and thus mute transmissions on the same resource elements. In that case, the wireless device is unable to measure interference from such cells which might lead to interference underestimation. This indicates also that IMR configurations should be carefully planned across the network in order to capture accurate interference levels. Planning imposes an extra constraint on the flexibility of using IMRs. Especially in case of massive or super dense deployments of network nodes, shortage of available IMR configurations might limit performance of interference estimation.

SUMMARY

It is an object to provide an improved interference estimation compared to the prior art.

According to a first aspect, it is provided a method for assisting downlink interference estimation in a cellular network. The method is performed in a network node of the cellular network and comprises the steps of: estimating an average transmit power of the network node in a future time period, resulting in a scaling factor indicating the average transmit power of the network node in relation to a reference transmit power of the network node; transmitting, in a resource element allocated to interference estimation, a reference signal for downlink interference estimation with a transmission power which is based on the scaling factor; and refraining from transmitting in a resource element in at least one instance where another network node transmits a reference signal for downlink interference estimation. In this way, wireless devices can estimate interference in accordance with predicted future transmit power, leading to more accurate interference estimation. Moreover, the wireless devices do not need to be modified in any way to take advantage of this since the estimated future transmit power is reflected in the transmission power of the reference signal.

The step of estimating an average transmit power may comprise estimating the average transmit power based on an average cell load which is estimated using a downlink buffer status associated with the at least one wireless device being served by the network node. The downlink buffer status is a good indicator of future traffic level and thus future average transmit power.

The step of estimating an average transmit power may comprise estimating the average transmit power based on traffic patterns of services used by the at least one wireless device being served by the network node.

The step of estimating an average transmit power may comprise estimating the average transmit power based on a capability of the at least one wireless device being served by the network node. In this way, an indicator of the maximum traffic that can be received by the wireless device is also considered.

The step of estimating an average transmit power may comprise estimating the average transmit power based on an indication of resources which are low utilisation resources which are being prevented from being fully used due to downlink inter cell interference. For example, this is used in ICIC (Inter-cell Interference coordination).

The method may further comprise the step of: determining whether the network node is to transmit or refrain from transmitting in a resource element based on a predefined reference signal configuration. The reference signal configuration can differ between adjacent network nodes such that, for a wireless device, only one potential source of reference signals is muted at any one resource element. The wireless device can then measure interference at the resource element when the network node serving the wireless device refrains from transmitting a reference signal.

The step of transmitting a reference signal may comprise transmitting the reference signal being specific for the network node at a predefined time and frequency.

According to a second aspect, it is provided a network node arranged to assist downlink interference estimation in a cellular network. The network node comprises: a processor; and a memory storing instructions that, when executed by the processor, cause the network node to: estimate an average transmit power of the network node in a future time period, resulting in a scaling factor indicating the average transmit power of the network node in relation to a reference transmit power of the network node; transmit, in a resource element allocated to interference estimation, a reference signal for downlink interference estimation with a transmission power which is based on the scaling factor; and refrain from transmitting in a resource element in at least one instance where another network node transmits a reference signal for downlink interference estimation.

The instructions to estimate an average transmit power may comprise instructions that, when executed by the processor, cause the network node to estimate the average transmit power based on an average cell load which is estimated using a downlink buffer status associated with the at least one wireless device being served by the network node.

The instructions to estimate an average transmit power may comprise instructions that, when executed by the processor, cause the network node to estimate the average transmit power based on traffic patterns of services used by the at least one wireless device being served by the network node.

The instructions to estimate an average transmit power may comprise instructions that, when executed by the processor, cause the network node to estimate the average transmit power based on a capability of the at least one wireless device being served by the network node.

The instructions to estimate an average transmit power may comprise instructions that, when executed by the processor, cause the network node to estimate the average transmit power based on an indication of resources which are low utilisation resources which are being prevented from being fully used due to downlink inter cell interference.

The network node may further comprise instructions that, when executed by the processor, cause the network node to determine whether to transmit or refrain from transmitting in a resource element based on a predefined reference signal configuration.

The instructions to transmit a reference signal may comprise instructions that, when executed by the processor, cause the network node to transmit the reference signal being specific for the network node at a predefined time and frequency.

According to a third aspect, it is provided a network node comprising means for estimating an average transmit power of the network node in a future time period, resulting in a scaling factor indicating the average transmit power of the network node in relation to a reference transmit power of the network node; means for transmitting, in a resource element allocated to interference estimation, a reference signal for downlink interference estimation with a transmission power which is based on the scaling factor; and means for refraining from transmitting in a resource element in at least one instance where another network node transmits a reference signal for downlink interference estimation.

The means for of estimating an average transmit power may comprise means for estimating the average transmit power based on an average cell load which is estimated using a downlink buffer status associated with the at least one wireless device being served by the network node.

The means for estimating an average transmit power may comprise means for estimating the average transmit power based on traffic patterns of services used by the at least one wireless device being served by the network node.

The means for estimating an average transmit power may comprise means for estimating the average transmit power based on a capability of the at least one wireless device being served by the network node.

The means for estimating an average transmit power may comprise means for estimating the average transmit power based on an indication of resources which are low utilisation resources which are being prevented from being fully used due to downlink inter cell interference.

The network node may further comprise means for determining whether the network node is to transmit or refrain from transmitting in a resource element based on a predefined reference signal configuration.

The means for transmitting a reference signal may comprise means for transmitting the reference signal being specific for the network node at a predefined time and frequency.

According to a fourth aspect, it is provided a computer program comprising computer program code which, when run on a network node, causes the network node to: estimate an average transmit power of the network node in a future time period, resulting in a scaling factor indicating the average transmit power of the network node in relation to a reference transmit power of the network node; transmit in a resource element allocated to interference estimation, a reference signal for downlink interference estimation with a transmission power which is based on the scaling factor; and refrain from transmitting in a resource element in at least one instance where another network node transmits a reference signal for downlink interference estimation.

According to a fifth aspect, it is provided a computer program product comprising a computer program according to the fourth aspect and a computer readable means on which the computer program is stored.

It is to be noted that any feature of the first, second, third, fourth and fifth aspects may, when appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
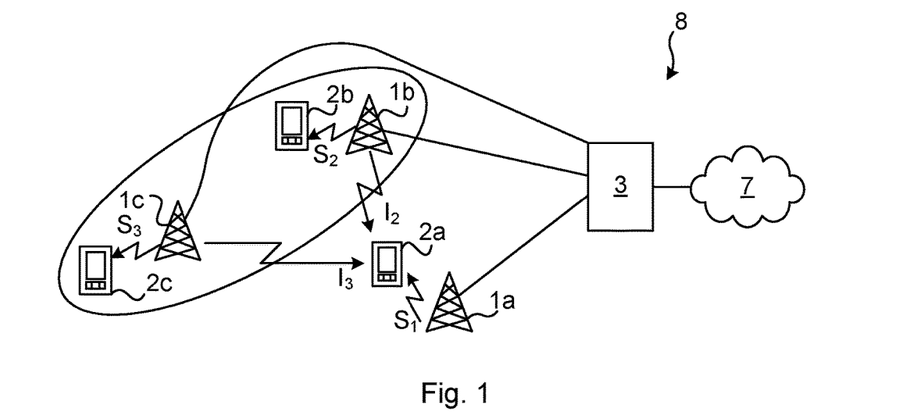
FIG. 1 is a schematic diagram illustrating an environment where embodiments presented herein can be applied.

FIG. 1 is a schematic diagram illustrating an environment where embodiments presented herein can be applied. A cellular network 8 comprises a core network 3 and a radio access network comprising a first network node 1a, a second network node 1b and a third network node 1c. The network nodes 1a-c, are here in the form of evolved Node Bs also known as eNBs but could also be in the form of Node Bs (NodeBs/NBs) and/or BTSs (Base Transceiver Stations) and/or BSSs (Base Station Subsystems), etc. The network nodes 1a-c provide radio connectivity to a plurality of wireless devices 2a-c. The term wireless device is also known as user equipment (UE), mobile terminal, user terminal, user agent, etc.

Each one of the network nodes 1a-c provides radio coverage in one or more respective radio cells. Uplink (UL) communication, from the wireless devices 2a-c to the network nodes 1a-c, and downlink (DL) communication, from the network nodes 1a-c to the wireless devices 2a-c occur over a wireless radio interface. The radio conditions of the wireless radio interface vary over time and also depend on the position of the respective wireless devices 2a-c, due to effects such as interference, fading, multipath propagation, etc.

The core network 3 provides access to central functions in the mobile communication network and connectivity to other communication networks 7.

The cellular network 8 may e.g. comply with any one or a combination of LTE (Long Term Evolution), UMTS utilising W-CDMA (Wideband Code Division Multiplex), CDMA2000 (Code Division Multiple Access 2000), or any other current or future wireless network, as long as the principles described hereinafter are applicable. Nevertheless, LTE will be used below to fully illustrate a context in which embodiments presented herein can be applied.

Looking now at the radio access network, the first network node 1a provides coverage to a first wireless device 2a, the second network node 1b provides coverage to a second wireless device 2b and the third network node 1c provides coverage to a third wireless device 2c.

The first wireless device 2a receives a first downlink signal $S_1$ from the first network node 1a. The second wireless device 2b receives a second downlink signal $S_2$ from the second network node 1b. The third wireless device 2c receives a third downlink signal $S_3$ from the third network node 1c. However, looking from the perspective of the first wireless device 2a, the second downlink signal $S_2$ also results in a first interfering downlink signal $I_2$ and the third downlink signal $S_3$ also results in a second interfering downlink signal $I_3$.

Downlink interfering signals also exist for the second wireless device 2b and the third wireless device 2c, but these interfering signals are omitted in FIG. 1 for reasons of clarity.

Looking now to FIGS. 2-4, some aspects of channel structure for LTE will be explained.

Figure 2:
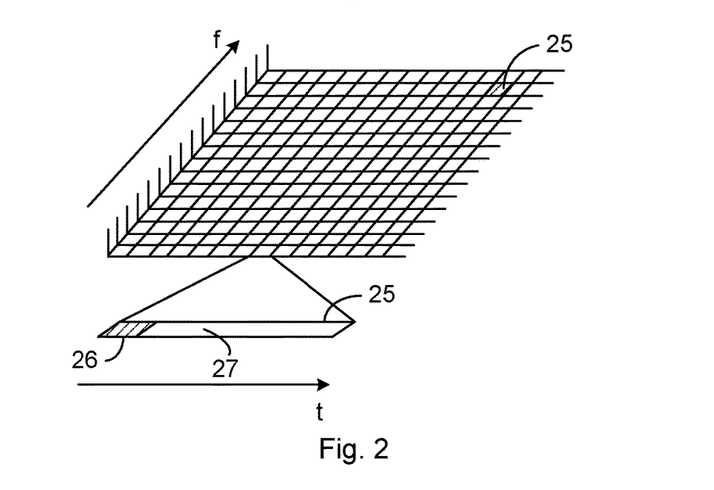
FIG. 2 is a schematic diagram illustrating the physical resources for LTE downlink.

FIG. 2 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 25 corresponds to one OFDM subcarrier during one OFDM symbol interval. Each resource element 25 comprises cyclic prefix section 26 and a main section 27.

Figure 3:
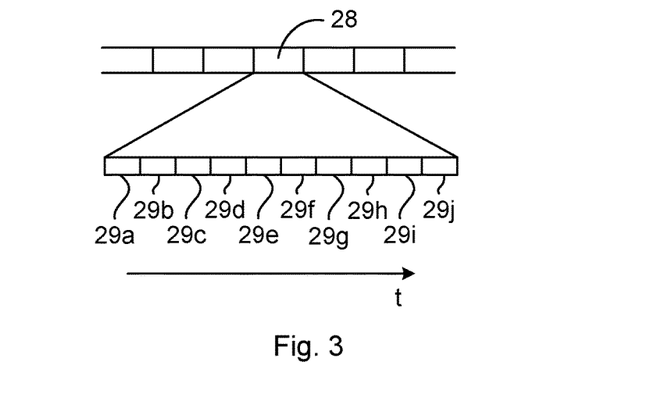
FIG. 3 is a schematic diagram illustrating LTE time-domain structure.

FIG. 3 is a schematic diagram illustrating LTE time-domain structure. In the time domain, LTE downlink transmissions are organised into radio frames 28 of 10 ms, each radio frame consisting of ten equally-sized subframes 29a-j of length $T_{subframe}=1$ ms, as can be seen in FIG. 3.

Figure 4:
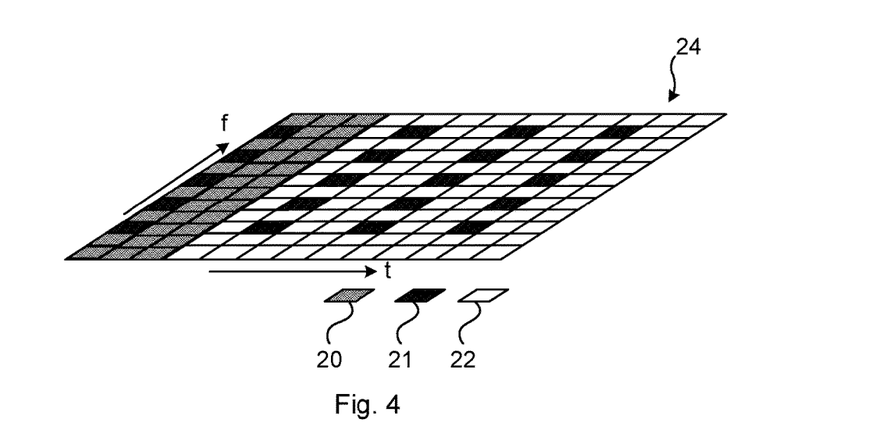
FIG. 4 is a schematic diagram illustrating a downlink resource block.

FIG. 4 is a schematic diagram illustrating a downlink resource block 24. The resource allocation in LTE is typically described in terms of resource blocks (RB), where a resource block can correspond to one slot (0.5 ms) in the time domain and twelve subcarriers in the frequency domain. A pair of two adjacent resource blocks in the time direction (1.0 ms) is known as a resource block pair. Each resource block comprises a number of resource elements, where each resource element occupies one subcarrier in the frequency domain and one OFDM symbol in the time domain. The number of OFDM symbols in a resource block can vary and can e.g. be six or seven OFDM symbols.

Downlink transmissions are dynamically scheduled, i.e. in each subframe the network node transmits control information about to which wireless devices data is transmitted and upon which resource blocks the data is transmitted, in the current downlink subframe. This control signaling is typically transmitted in a control region 20 in the first one, two or three OFDM symbols in each subframe and the number n=1, 2 or 3 is known as the Control Format Indicator (CFI), thus indicating the number of OFDM symbols being part of the control region 20. The downlink subframe also contains cell specific reference signals (CRS) 21, which are known to the receiver and used for interference estimation and coherent demodulation of, e.g., the control information and payload data. The remaining resource elements are available for payload data 22, also comprising interspersed CRS elements 21. A downlink system with CFI=3 OFDM symbols as control for a resource block 29 is illustrated in FIG. 4.

Figure 5:
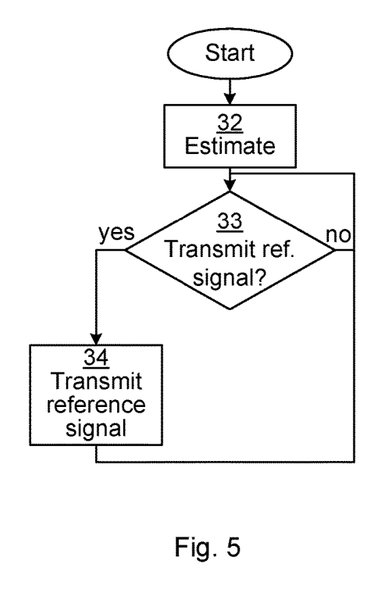
FIG. 5 is a flow chart illustrating a method performed in a network node of FIG. 1 for assisting downlink interference estimation.

FIG. 5 is a flow chart illustrating a method performed in a network node of FIG. 1 for assisting downlink interference estimation.

The method is performed in one of the network nodes 1a-c of FIG. 1.

In an estimate step 32, the network node estimates an average transmit power of the network node in a future time period. This results in a scaling factor indicating the average transmit power of the network node in relation to a reference transmit power of the network node for the period in question. In other words, the scaling factor is based on the average transmit power and a reference transmit power of the network node for the period. The reference transmit power can e.g. be a maximum operational power according to a current power level configuration of the network node.

In one embodiment, the estimation of the average transmit power is based on an average cell load. The average cell load is in turn estimated using a downlink buffer status associated with the wireless devices which are currently being served by the network node. If downlink buffers of the wireless device(s) served by the network node are empty then the resource utilisation and hence the average data transmit power is likely to be very low or even zero. On the other hand, if downlink buffers are not empty, the network node can estimate the average transmit power needed to serve the remaining load based on the size of the downlink buffers and a historic performance of each wireless device. The performance can e.g. be an average throughput for the wireless device.

In one embodiment, the estimation of the average transmit power is based on traffic patterns of services used by the wireless devices which are served by the network node. By using the type of service of each wireless device served by the network node, the network node can predict future traffic and its time dynamics and hence better predict the average transmit power in the future. For example, when a wireless device has a service of best effort traffic, the network node will typically serve that user continuously until its downlink buffer is empty. On the other hand, when the service is TCP traffic then the cell will have to transmit data at specific time instances. More specifically, there are traffic patterns which are typical for services such as voice, streaming video, streaming audio, etc. which can be exploited to improve the estimation of the average transmit power.

In one embodiment, the estimation of the average transmit power is based on a capability of the at least one wireless device being served by the network node. This can be indicated by a category of each wireless device served by the network node. In LTE, a number of categories for wireless devices (or UEs) have been identified, indicating e.g. maximum bitrate and bandwidth capabilities of the wireless device. For example, a wireless device which can support only up to 5 MHz system bandwidth will occupy half of the available resources provided by a network node with system bandwidth of 10 MHz. Hence, there is only a positive transmit power possible for half of the available system bandwidth.

In one embodiment, the estimation of the average transmit power is based on an indication of resources which are prevented from being used due to downlink inter cell interference, such as in ICIC (Inter-cell Interference coordination). In ICIC, some transmission resource elements of an interfering network node are set to be low utilisation resources which are muted (or reduced in power) to reduce downlink interference to a wireless device served by another network node. Such knowledge of low utilisation resources implying future reduction of transmission power can be considered in the estimation of the average transmit power to improve accuracy even further.

In a conditional transmit reference signal step 33, the network node determines whether to transmit or refrain from transmitting a reference signal in a specific resource element based on a predefined reference signal configuration. This reference signal configuration is stored in the network node and defines whether the resource element in question belongs to a first subset containing muted resource elements or a second subset containing resource elements for which a reference signal is to be transmitted. The reference signal configuration can e.g. define the pattern defining the set of resource elements which can potentially be used for reference signal transmissions (which is the same for all network nodes) and also what resource elements of those which can be used for reference signal transmissions that belong to the first or second subset (which is configured to vary between network nodes). It is to be noted that the reference signal configuration of what reference signal resource elements belong to the first or second subset, respectively, can be unique for each network node within the cellular network. Alternatively, the same reference signal configuration could be reused for network nodes which are sufficiently geographically separated to not interfere with each other.

When it is determined that a reference signal is to be transmitted, the method continues to a transmit reference signal step 34. Otherwise, the method returns to the transmit reference signal step 33 for another potential reference signal resource element. The set of resource elements over which the conditional loop is performed is defined by the used reference signal configuration. It is to be noted that this step 33, as well as the transmit reference signal step 34 can be performed in parallel for a plurality of potential reference signal transmissions.

In the transmit reference signal step 34, the network node transmits, in a resource element allocated to interference estimation, a reference signal for downlink interference estimation, e.g. similar to how CRS is performed. However, here the reference signal is transmitted with a transmission power which is based on the scaling factor. In one embodiment, the transmission power is calculated by multiplying a reference transmit power for the network node with the scaling factor.

In one embodiment, the reference signal is specific for the network node at a predefined time and frequency.

Hence, for resource elements being part of the first subset containing muted resource elements, the network node refrains from transmitting in a resource element which is then typically used by at least one instance where another network node is to transmit a reference signal for downlink interference estimation. In other words, the network node is mute during a set of resource elements where other network nodes transmit their reference signals.

According to this method, interference estimation in the wireless device occurs on a set of dedicated resource elements for selectively transmitting reference signals for downlink interference estimation. This set of resource elements is divided in two subsets, which differs between neighbouring network nodes. A first subset contains a number of muted resource elements in which the network node in question refrains from transmitting any reference signals. A second subset contains a number of resource elements where a reference signal is transmitted (see the transmit reference signal step 34 above) with a transmission power which is scaled according to predicted transmission power. The first subset of resource elements is used by wireless devices served by the network node for measuring interference of the surrounding cells. The second subset provides interference estimates to other cells which then correspond to estimated future transmissions.

The set of dedicated resource elements is configured to be the same for all network nodes within the network but the first and second subsets differ between network nodes in terms of what resource elements of the set belong to the first subset and second subset, respectively. Hence, resource elements that belong to the first subset for one network node then belong to the second subset for other network nodes. For example, the IMR used for interference estimation introduced in LTE Release 11 can be used for this purpose, along with the estimation and scaling of transmission power described above.

The length of the time period for which an average transmit power is estimated should be chosen carefully. A shorter time period gives a more accurate estimation of the average transmit power since the estimation will be more representative of the instantaneous downlink transmissions and the estimate will better follow traffic dynamics. However, the time period should be long enough to allow the estimates to occur without excessive use of signaling or available hardware resources.

Moreover, the length of the time period can also depend on the traffic dynamics of each cell. The time period for a cell which experiences static traffic load, and thereby static transmit power, can have a longer time period than a cell which experiences great traffic variation.

In one embodiment, when applied in LTE releases available at the time of filing this patent application, the time period can be the TTI (Transmission Time Interval) which is the length of a subframe, i.e. 1 ms or up to 80 ms. In fact, depending on the application, the time period could be anywhere from a tenth of a ms to several hundreds of ms.

The time period can be a system parameter in the network node that may be reconfigured statically at deployment, semi-statically (e.g. using messaging from higher layers) or even dynamically depending on experienced variation in transmit power.

Figure 6:
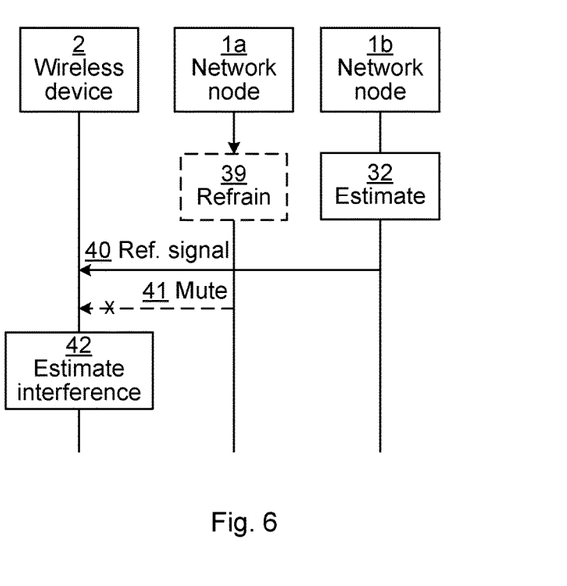
FIG. 6 is a sequence diagram illustrating communication between a network node and a wireless device of FIG. 1.

FIG. 6 is a sequence diagram illustrating communication between a network node and a wireless device of FIG. 1. The sequence diagram corresponds to the method shown in FIG. 5 which is described above.

In this example, a wireless device 2 is served by a first network node 1a. A second network node 1b is an interfering network node for downlink traffic to the wireless device.

The second network node 1b estimates 32 the average transmit power as described above and sends a reference signal 40 in a resource element belonging to the second subset as described above. The same resource element belongs to the first subset for the first network node 1a. Hence, the first network node 1a refrains 39 from estimation and the first network node 1a is mute 41 for that resource element.

In this way, the wireless device 2 can estimate 42 future downlink interference using the reference signal 40 from the second network node 1b. Since the reference signal 40 from the second network node 1b is scaled in power according the estimated average transmit power, the estimation of downlink interference is greatly improved compared to the prior art.

The downlink estimation can be expanded to more network nodes acting as downlink interference for the wireless device 2, corresponding to the first network node 1a in FIG. 6.

Figure 7:
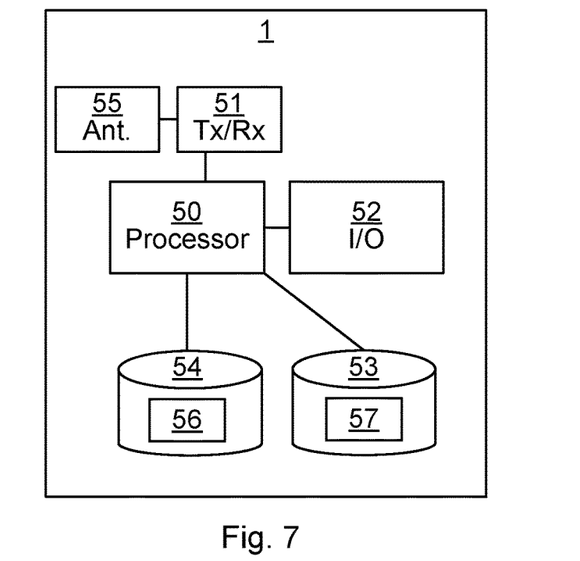
FIG. 7 is a schematic diagram showing some components of any one of the network nodes of FIGS. 1 and 6.

FIG. 7 is a schematic diagram showing some components of any one of the network nodes of FIGS. 1 and 6, here represented by a single network node 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIG. 5 above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

The network node 1 further comprises an I/O interface 52 for communicating with the core network and optionally with other network nodes.

The network node 1 also comprises one or more transceivers 51, comprising analogue and digital components, and a suitable number of antennas 55 for radio communication with wireless devices within one or more radio cells, optionally using remote radio units and/or sectors. The processor 50 controls the general operation of the network node 1, e.g. by sending control signals to the transceiver 51 and receiving reports from the transceiver 51 of its operation. In one embodiment, the I/O interface 52 is directly connected to the transceiver 51, whereby data to and from the core network is directly routed between the I/O interface 52 and the transceiver 51.

Other components of the network node 1 are omitted in order not to obscure the concepts presented herein.

Figure 8:
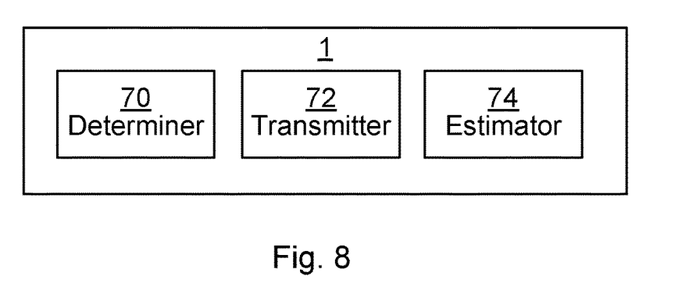
FIG. 8 is a schematic diagram showing functional modules of the network node of FIG. 7.

FIG. 8 is a schematic diagram showing functional modules of the network node of FIG. 7. The modules can be implemented using software instructions such as a computer program executing in the network node 1 and/or using hardware, such as application specific integrated circuits, field programmable gate arrays, discrete logical components, etc. The modules correspond to the steps in the method illustrated in FIG. 5.

A determiner 70 is arranged to determine whether to transmit or refrain from transmitting a reference signal in a specific resource element based on a predefined reference signal configuration. This module corresponds to the conditional transmit reference signal step 33 of FIG. 5.

An estimator 74 is arranged to estimate an average transmit power of the network node in a future time period, resulting in a scaling factor indicating the average transmit power of the network node in relation to a reference transmit power of the network node. This module corresponds to the estimate step 32 of FIG. 5.

A transmitter 72 is arranged to transmit, in a resource element allocated to interference estimation, a reference signal for downlink interference estimation with a transmission power which is based on the scaling factor. This module corresponds to the transmit reference signal step 34 of FIG. 5.

Moreover, the transmitter 72 is arranged to refrain from transmitting in a resource element in at least one instance where another network node transmits a reference signal for downlink interference estimation.

Figure 9:
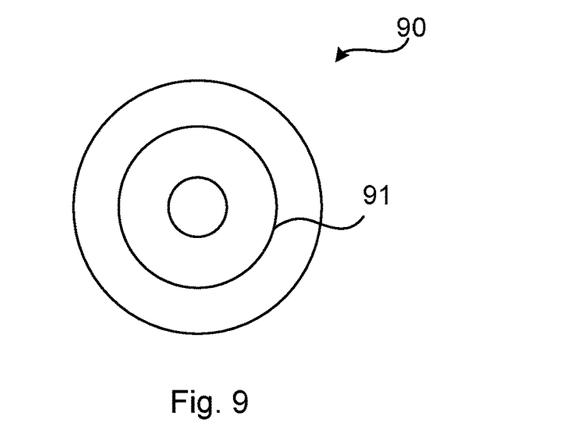
FIG. 9 shows one example of a computer program product 90 comprising computer readable means

FIG. 9 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 7. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting downlink interference estimation in a cellular network, performed in a network node of the cellular network and comprising the steps of:
   estimating an average transmit power of the network node in a future time period, resulting in a scaling factor indicating the average transmit power of the network node in relation to a reference transmit power of the network node, wherein the average transmit power in the future time period is estimated based on predicted traffic patterns of services used by wireless devices which are served by the network node;
   determining whether the network node is to transmit or refrain from transmitting in a resource element based on a predefined reference signal configuration, wherein the reference signal configuration defines a pattern defining a set of resource elements which can be used for reference signal transmissions and also defining which of the resource elements belong to a first subset of resource elements containing muted resource elements or a second subset of resource elements containing resource elements for which a reference signal is to be transmitted, wherein the reference signal configuration of the elements belonging to the first subset or second subset is unique for each network node within the cellular network;
   transmitting, in a resource element allocated to interference estimation, a reference signal for downlink interference estimation with a transmission power which is based on the scaling factor; and
   refraining from transmitting in a resource element in at least one instance where another network node transmits a reference signal for downlink interference estimation.

2. The method according to claim 1, wherein the step of estimating an average transmit power comprises estimating the average transmit power based on an average cell load which is estimated using a downlink buffer status associated with at least one wireless device being served by the network node.

3. The method according to claim 1, wherein the step of estimating an average transmit power comprises estimating the average transmit power based on a capability of at least one wireless device being served by the network node.

4. The method according to claim 1, wherein the step of estimating an average transmit power comprises estimating the average transmit power based on an indication of resources which are low utilization resources that are being prevented from being fully used due to downlink inter cell interference.

5. The method according to claim 1, wherein the step of transmitting a reference signal comprises transmitting the reference signal being specific for the network node at a predefined time and frequency.

6. The method of claim 1, wherein estimating the average transmit power of the network node in the future time period comprises predicting at least one of a future traffic, time dynamics of the future traffic and average transmit power in the future.

7. A network node configured to assist downlink interference estimation in a cellular network, the network node comprising:
   a processor; and
   a memory storing instructions that, when executed by the processor, cause the network node to:
      estimate an average transmit power of the network node in a future time period, resulting in a scaling factor indicating the average transmit power of the network node in relation to a reference transmit power of the network node, wherein the average transmit power is estimated based on predicted traffic patterns of services used by wireless devices which are served by the network node;
      determine, whether to transmit or refrain from transmitting in a resource element based on a predefined reference signal configuration, wherein the reference signal configuration defines a pattern defining a set of resource elements which can be used for reference signal transmissions and also defining which of the resource elements belong to a first subset of resource elements containing muted resource elements or a second subset of resource elements containing resource elements for which a reference signal is to be transmitted, wherein the reference signal configuration of the resource elements belonging to the first subset or second subset is unique for each network node within the cellular network;
      transmit, in a resource element allocated to interference estimation, a reference signal for downlink interference estimation with a transmission power which is based on the scaling factor, wherein transmitting the reference signal comprises transmitting the reference signal being specific for the network node at a predefined time and frequency; and
      refrain from transmitting in a resource element in at least one instance where another network node transmits a reference signal for downlink interference estimation.

8. The network node according to claim 7, wherein the instructions to estimate an average transmit power comprise instructions that, when executed by the processor, cause the network node to estimate the average transmit power based on an average cell load which is estimated using a downlink buffer status associated with at least one wireless device being served by the network node.

9. The network node according to claim 7, wherein the instructions to estimate an average transmit power comprise instructions that, when executed by the processor, cause the network node to estimate the average transmit power based on a capability of at least one wireless device being served by the network node.

10. The network node according to claim 7, wherein the instructions to estimate an average transmit power comprise instructions that, when executed by the processor, cause the network node to estimate the average transmit power based on an indication of resources which are low utilization resources that are being prevented from being fully used due to downlink inter cell interference.

11. The network node according to claim 7, wherein the instructions to transmit the reference signal comprises transmitting the reference signal being specific for the network node at a predefined time and frequency.

12. A non-transitory computer-readable medium storing a computer program comprising computer program instructions that, when executed by processing circuitry of network node, configures the network node to assist downlink interference estimation in a cellular network, the computer program comprising instructions configuring the network node to:
- estimate an average transmit power of the network node in a future time period, resulting in a scaling factor indicating the average transmit power of the network node in relation to a reference transmit power of the network node, wherein the average transmit power is estimated based on predicted traffic patterns of services used by wireless devices which are served by the network node;
- determine, whether to transmit or refrain from transmitting in a resource element based on a predefined reference signal configuration; wherein the reference signal configuration defines a pattern defining a set of resource elements which can be used for reference signal transmissions and also defining which of the resource elements belong to a first subset of resource elements containing muted resource elements or a second subset of resource elements containing resource elements for which a reference signal is to be transmitted, wherein the reference signal configuration of the resource elements belonging to the first subset or second subset is unique for each network node within the cellular network;
- transmit in a resource element allocated to interference estimation, a reference signal for downlink interference estimation with a transmission power which is based on the scaling factor; and
- refrain from transmitting in a resource element in at least one instance where another network node transmits a reference signal for downlink interference estimation.

* * * * *